(12) United States Patent  
Umemoto et al.

(10) Patent No.: US 9,028,761 B2
(45) Date of Patent: *May 12, 2015

(54) EXHAUST PURIFICATION SYSTEM OF INTERNAL COMBUSTION ENGINE

(75) Inventors: Kazuhiro Umemoto, Susono (JP); Kohei Yoshida, Gotenba (JP); Mikio Inoue, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/263,660

(22) PCT Filed: Dec. 24, 2010

(86) PCT No.: PCT/JP2010/073878
§ 371 (c)(1),
(2), (4) Date: Oct. 7, 2011

(87) PCT Pub. No.: WO2012/086094
PCT Pub. Date: Jun. 28, 2012

(65) Prior Publication Data
US 2013/0259752 A1 Oct. 3, 2013

(51) Int. Cl.
*B01D 53/34* (2006.01)
*B01D 53/56* (2006.01)
(Continued)

(52) U.S. Cl.
CPC ............ *B01D 53/9477* (2013.01); *F01N 3/208* (2013.01); *F01N 2610/03* (2013.01); *F01N 2900/1402* (2013.01); *F01N 2900/1602* (2013.01); *F01N 2900/1621* (2013.01); *Y02T 10/24* (2013.01); *F01N 13/0093* (2014.06)

(58) Field of Classification Search
None
See application file for complete search history.

(56) References Cited

U.S. PATENT DOCUMENTS

| 5,052,178 A | 10/1991 | Clerc et al. |
| 5,057,483 A | 10/1991 | Wan |

(Continued)

FOREIGN PATENT DOCUMENTS

| CN | 101454081 A | 6/2009 |
| CN | 101600860 A | 12/2009 |

(Continued)

OTHER PUBLICATIONS

International Search Report issued in International Patent Application No. PCT/JP2011/075618 dated Dec. 27, 2011.

(Continued)

*Primary Examiner* — Walter D Griffin
*Assistant Examiner* — Jelitza Perez
(74) *Attorney, Agent, or Firm* — Oliff PLC

(57) ABSTRACT

In an internal combustion engine, inside of an engine exhaust passage, a hydrocarbon feed valve (15) and an exhaust purification catalyst (13) are arranged. The exhaust purification catalyst (13) is comprised of an upstream-side catalyst (14a) and a downstream-side catalyst (14b) arranged in series at an interval from each other. The upstream-side catalyst (14b) has a smaller cross-sectional area than the downstream-side catalyst (14b). The concentration of hydrocarbons which flow into the upstream-side catalyst (14a) is made to vibrate by within a predetermined range of amplitude of a 200 ppm or more and within a predetermined range of period of 5 seconds or less, whereby the $NO_x$ which is contained in exhaust gas is reduced at the exhaust purification catalyst (13).

8 Claims, 13 Drawing Sheets

(51) Int. Cl.
    *F01N 3/10* (2006.01)
    *B01D 53/94* (2006.01)
    *F01N 3/20* (2006.01)
    *F01N 13/00* (2010.01)

(56) References Cited

U.S. PATENT DOCUMENTS

| | | | |
|---|---|---|---|
| 5,075,274 | A | 12/1991 | Kiyohide et al. |
| 5,402,641 | A | 4/1995 | Katoh et al. |
| 5,882,607 | A | 3/1999 | Miyadera et al. |
| 6,109,024 | A | 8/2000 | Kinugasa et al. |
| 6,327,851 | B1 | 12/2001 | Bouchez et al. |
| 6,413,483 | B1 | 7/2002 | Brisley et al. |
| 6,477,834 | B1 | 11/2002 | Asanuma et al. |
| 6,667,018 | B2 | 12/2003 | Noda et al. |
| 6,813,882 | B2 | 11/2004 | Hepburn et al. |
| 6,854,264 | B2 | 2/2005 | Elwart et al. |
| 6,877,311 | B2 | 4/2005 | Uchida |
| 6,983,589 | B2 | 1/2006 | Lewis et al. |
| 7,063,642 | B1 | 6/2006 | Hu et al. |
| 7,073,325 | B2 | 7/2006 | Nakatani et al. |
| 7,082,753 | B2 * | 8/2006 | Dalla Betta et al. ............ 60/286 |
| 7,111,456 | B2 | 9/2006 | Yoshida et al. |
| 7,137,379 | B2 | 11/2006 | Sasaki et al. |
| 7,146,800 | B2 | 12/2006 | Toshioka et al. |
| 7,165,393 | B2 | 1/2007 | Betta et al. |
| 7,299,625 | B2 | 11/2007 | Uchida et al. |
| 7,332,135 | B2 * | 2/2008 | Gandhi et al. ................ 422/177 |
| 7,412,823 | B2 | 8/2008 | Reuter et al. |
| 7,454,900 | B2 | 11/2008 | Hayashi |
| 7,484,504 | B2 | 2/2009 | Kato et al. |
| 7,506,502 | B2 | 3/2009 | Nakano et al. |
| 7,549,284 | B2 | 6/2009 | Iihoshi et al. |
| 7,703,275 | B2 | 4/2010 | Asanuma et al. |
| 7,707,821 | B1 | 5/2010 | Legare |
| 7,861,516 | B2 | 1/2011 | Allansson et al. |
| 8,099,950 | B2 | 1/2012 | Kojima et al. |
| 8,215,101 | B2 | 7/2012 | Tsujimoto et al. |
| 8,261,532 | B2 | 9/2012 | Fukuda et al. |
| 8,281,569 | B2 | 10/2012 | Handa et al. |
| 8,434,296 | B2 | 5/2013 | Wada et al. |
| 8,572,950 | B2 | 11/2013 | Bisaiji et al. |
| 8,656,706 | B2 | 2/2014 | Umemoto et al. |
| 8,671,667 | B2 | 3/2014 | Bisaiji et al. |
| 8,679,410 | B2 | 3/2014 | Umemoto et al. |
| 8,689,543 | B2 | 4/2014 | Numata et al. |
| 8,695,325 | B2 | 4/2014 | Bisaiji et al. |
| 2001/0052232 | A1 | 12/2001 | Hoffmann et al. |
| 2002/0029564 | A1 | 3/2002 | Roth et al. |
| 2003/0010020 | A1 | 1/2003 | Taga et al. |
| 2003/0040432 | A1 | 2/2003 | Beall et al. |
| 2003/0101713 | A1 | 6/2003 | Betta et al. |
| 2004/0045285 | A1 | 3/2004 | Penetrante et al. |
| 2004/0050037 | A1 | 3/2004 | Betta et al. |
| 2004/0055285 | A1 | 3/2004 | Rohr et al. |
| 2004/0154288 | A1 | 8/2004 | Okada et al. |
| 2004/0175305 | A1 | 9/2004 | Nakanishi et al. |
| 2004/0187477 | A1 | 9/2004 | Okugawa et al. |
| 2005/0135977 | A1 | 6/2005 | Park et al. |
| 2005/0147541 | A1 | 7/2005 | Ajisaka et al. |
| 2006/0053778 | A1 | 3/2006 | Asanuma et al. |
| 2006/0107657 | A1 | 5/2006 | Bernler et al. |
| 2006/0153761 | A1 | 7/2006 | Bandl-Konrad et al. |
| 2006/0286012 | A1 | 12/2006 | Socha et al. |
| 2007/0016357 | A1 | 1/2007 | Nakagawa et al. |
| 2007/0028601 | A1 | 2/2007 | Duvinage et al. |
| 2007/0059223 | A1 | 3/2007 | Golunski et al. |
| 2007/0089403 | A1 | 4/2007 | Pfeifer et al. |
| 2007/0125073 | A1 | 6/2007 | Reuter et al. |
| 2007/0151232 | A1 | 7/2007 | Dalla Betta et al. |
| 2008/0022662 | A1 | 1/2008 | Yan |
| 2008/0053073 | A1 | 3/2008 | Kalyanaraman et al. |
| 2008/0102010 | A1 | 5/2008 | Bruck et al. |
| 2008/0120963 | A1 | 5/2008 | Morita et al. |
| 2008/0148711 | A1 | 6/2008 | Takubo |
| 2008/0154476 | A1 | 6/2008 | Takubo |
| 2008/0196398 | A1 | 8/2008 | Yan |
| 2008/0223020 | A1 | 9/2008 | Yoshida et al. |
| 2008/0276602 | A1 | 11/2008 | McCabe et al. |
| 2009/0000277 | A1 | 1/2009 | Yoshida et al. |
| 2009/0049824 | A1 | 2/2009 | Kojima et al. |
| 2009/0049825 | A1 | 2/2009 | Ohashi |
| 2009/0049826 | A1 | 2/2009 | Toshioka et al. |
| 2009/0077948 | A1 | 3/2009 | Mondori et al. |
| 2009/0084091 | A1 * | 4/2009 | Tsujimoto et al. ............... 60/299 |
| 2009/0118121 | A1 | 5/2009 | Sarai |
| 2009/0120072 | A1 | 5/2009 | Dalla Betta et al. |
| 2009/0151332 | A1 | 6/2009 | Toshioka et al. |
| 2009/0191108 | A1 | 7/2009 | Blanchard et al. |
| 2009/0196811 | A1 | 8/2009 | Yamashita et al. |
| 2009/0229251 | A1 | 9/2009 | Kadowaki |
| 2009/0249768 | A1 | 10/2009 | Asanuma et al. |
| 2009/0266057 | A1 | 10/2009 | Tsujimoto et al. |
| 2009/0282809 | A1 | 11/2009 | Toshioka |
| 2009/0288393 | A1 | 11/2009 | Matsuno et al. |
| 2009/0313970 | A1 | 12/2009 | Iida |
| 2010/0005873 | A1 | 1/2010 | Katoh et al. |
| 2010/0055012 | A1 | 3/2010 | Grisstede et al. |
| 2010/0107613 | A1 | 5/2010 | Masuda et al. |
| 2010/0115923 | A1 | 5/2010 | Tsujimoto et al. |
| 2010/0126148 | A1 | 5/2010 | Morishima et al. |
| 2010/0132356 | A1 | 6/2010 | Lee |
| 2010/0154387 | A1 | 6/2010 | Shibata et al. |
| 2010/0233051 | A1 | 9/2010 | Grisstede et al. |
| 2010/0236224 | A1 | 9/2010 | Kumar et al. |
| 2010/0242459 | A1 | 9/2010 | Tsujimoto et al. |
| 2011/0041486 | A1 | 2/2011 | Kato et al. |
| 2011/0047984 | A1 | 3/2011 | Lee et al. |
| 2011/0047988 | A1 | 3/2011 | Lewis et al. |
| 2011/0113754 | A1 | 5/2011 | Kohara et al. |
| 2011/0120100 | A1 | 5/2011 | Yin et al. |
| 2011/0131952 | A1 | 6/2011 | Onodera et al. |
| 2011/0173950 | A1 | 7/2011 | Wan et al. |
| 2011/0209459 | A1 | 9/2011 | Hancu et al. |
| 2012/0122660 | A1 | 5/2012 | Andersen et al. |
| 2012/0124967 | A1 | 5/2012 | Yang et al. |
| 2012/0124971 | A1 | 5/2012 | Bisaiji et al. |
| 2012/0131908 | A1 | 5/2012 | Bisaiji et al. |
| 2013/0000284 | A1 | 1/2013 | Bisaiji et al. |
| 2013/0011302 | A1 | 1/2013 | Bisaiji et al. |
| 2013/0022512 | A1 | 1/2013 | Bisaiji et al. |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | 1 519 015 A2 | 3/2005 |
| EP | 1 710 407 A1 | 10/2006 |
| EP | 1 793 099 A1 | 6/2007 |
| EP | 1 911 506 A1 | 4/2008 |
| EP | 1 936 164 A1 | 6/2008 |
| EP | 1 965 048 A1 | 9/2008 |
| EP | 2 063 078 A1 | 5/2009 |
| EP | 2 149 684 A1 | 2/2010 |
| EP | 2 239 432 | 10/2010 |
| EP | 2 460 989 A1 | 6/2012 |
| JP | A-04-200637 | 7/1992 |
| JP | A-H08-117601 | 5/1996 |
| JP | A-09-004437 | 1/1997 |
| JP | A-09-220440 | 8/1997 |
| JP | A-11-30117 | 2/1999 |
| JP | A-11-062559 | 3/1999 |
| JP | A-11-081994 | 3/1999 |
| JP | A-2000-257419 | 9/2000 |
| JP | A-2002-188429 | 7/2002 |
| JP | A-2004-016850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-61340 | 3/2005 |
| JP | A-2005-113801 | 4/2005 |

(56) References Cited

FOREIGN PATENT DOCUMENTS

| | | |
|---|---|---|
| JP | A-2005-171853 | 6/2005 |
| JP | A-2005-177738 | 7/2005 |
| JP | A-2006-501390 | 1/2006 |
| JP | A-2006-512529 | 4/2006 |
| JP | A-2006-342700 | 12/2006 |
| JP | A-2007-064167 | 3/2007 |
| JP | A-2007-514090 | 5/2007 |
| JP | A-2007-514104 | 5/2007 |
| JP | A-2007-154794 | 6/2007 |
| JP | B2-3969450 | 9/2007 |
| JP | A-2007-278120 | 10/2007 |
| JP | A-2008-002451 | 1/2008 |
| JP | A-2008-19760 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A-2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | A-2011-190803 | 9/2011 |
| JP | B1-4868097 | 2/2012 |
| WO | WO 2005/059324 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 | 1/2008 |
| WO | WO 2009/016822 | 2/2009 |
| WO | WO 2009/056958 | 5/2009 |
| WO | WO 2009/082035 | 7/2009 |
| WO | WO 2011/114499 A1 | 9/2011 |
| WO | WO 2011/114501 | 9/2011 |
| WO | WO 2011/118044 | 9/2011 |

OTHER PUBLICATIONS

Written Opinion issued in International Patent Application No. PCT/JP2011/075618 dated Dec. 27, 2011.
U.S. Appl. No. 13/580,000, filed Aug. 20, 2012, in the name of Bisaiji et al.
Aug. 13, 2013 International Preliminary Report on Patentability issued in International Patent Application No. PCT/JP2011/053429 (with translation).
Aug. 8, 2013 Office Action issued in U.S. Appl. No. 13/258,483.
Feb. 6, 2014 Corrected Notice of Allowability issued in U.S. Appl. No. 13/202,694.
Dec. 21, 2010 International Search Report issued in International Patent Application No. PCT/JP2010/065449 (with translation).
Jun. 15, 2010 International Search Report issued in International Patent Application No. PCT/JP2010/054730 (with translation).
Nov. 22, 2010 International Search Report issued in International Patent Application No. PCT/JP2010/065186 (with translation).
Jan. 18, 2011 International Search Report issued in International Patent Application No. PCT/JP2010/067705.
Jan. 18, 2011 International Search Report issued in International Application No. PCT/JP2010/067707.
Jan. 18, 2011 International Search Report issued in International Patent Application No. PCT/JP2010/068785.
Jul. 14, 2014 Office Action issued in U.S. Appl. No. 13/262,001.
Jul. 14, 2014 Office Action issued in U.S. Appl. No. 13/264,884.
Jun. 16, 2014 Office Action issued in U.S. Appl. No. 13/581,186.
Jun. 18, 2014 Office Action issued in U.S. Appl. No. 13/582,909.
Jun. 19, 2014 Office Action issued in U.S. Appl. No. 13/264,594.
Jun. 21, 2011 International Search Report issued in International Patent Application No. PCT/JP2011/059880 (with English translation).
Jun. 23, 2014 Office Action issued in U.S. Appl. No. 13/262,858.
Jun. 26, 2014 Office Action issued in U.S. Appl. No. 13/580,000.
Jun. 29, 2010 International Search Report issued in International Patent Application No. PCT/JP2010/055303 (with translation).
Mar. 15, 2011 International Search Report issued in International Patent Application No. PCT/JP2011/053429 (with translation).
Mar. 22, 2011 International Search Report issued in International Patent Application No. PCT/JP2010/073645 (with translation).
Mar. 22, 2011 International Search Report issued in International Patent Application No. PCT/JP2010/072299 (with translation).
Mar. 8, 2011 International Search Report issued in International Patent Application No. PCT/JP2011/052969 (with translation).
May 15, 2013 Office Action in U.S. Appl. No. 13/202,694.
May 17, 2011 International Search Report issued in International Patent Application No. PCT/JP2011/057264 (with translation).
Mar. 28, 2014 Notice of Allowance issued in U.S. Appl. No. 13/582,862.
Mar. 4, 2014 Notice of Allowance issued in U.S. Appl. No. 13/255,786.
Nov. 13, 2013 Notice of Allowance issued in U.S. Appl. No. 13/202,692.
Oct. 17, 2013 Notice of Allowance issued in U.S. Appl. No. 13/202,694.
Nov. 22, 2010 International Search Report issued in International Patent Application No. PCT/JP2010/065187.
Nov. 26, 2012 Office Action issued in U.S. Appl. No. 13/202,694.
Oct. 26, 2010 International Search Report issued in International Patent Application No. PCT/JP2010/063135.
Oct. 26, 2012 Office Action issued in U.S. Appl. No. 13/202,692.
Oct. 23, 2013 Office Action issued in U.S. Appl. No. 13/263,272.
Apr. 23, 2014 Office Action issued in U.S. Appl. No. 13/260,986.
Apr. 3, 2014 Office Action issued in U.S. Appl. No. 13/259,574.
Dec. 20, 2013 Office Action issued in U.S. Appl. No. 13/264,230.
Jul. 1, 2014 Office Action issued in U.S. Appl. No. 13/257,789.
Jul. 24, 2013 Office Action issued in U.S. Appl. No. 13/202,692.
May 7, 2014 Office Action issued in U.S. Appl. No. 13/264,062.
May 8, 2014 Office Action issued in U.S. Appl. No. 13/375,674.
U.S. Appl. No. 13/202,692 in the name of Umemoto et al., filed Sep. 20, 2011.
U.S. Appl. No. 13/202,733 in the name of Bisaui et al., filed Sep. 30, 2011.
U.S. Appl. No. 13/257,789 in the name of Nishioka et al., filed on Oct. 14, 2011.
U.S. Appl. No. 13/258,483 in the name of Numata et al., filed Sep. 22, 2011.
U.S. Appl. No. 13/259,574 in the name of Tsukamoto et al., filed Sep. 23, 2011.
U.S. Appl. No. 13/259,885 in the name of Umemoto at al., filed Sep. 23, 2011.
U.S. Appl. No. 13/260,986 in the name of Watanabe et al., filed Sep. 29, 2011.
U.S. Appl. No. 13/262,858 in the name of Bisaiji at al., filed Oct. 4, 2011.
U.S. Appl. No. 13/263,272 in the name of Bisaiji et al., filed Oct. 6, 2011.
U.S. Appl. No. 13/264,062 in the name of Watanabe et al., filed Oct. 12, 2011.
U.S. Appl. No. 13/264,230 in the name of Bisadi et al., filed Oct. 13, 2011.
U.S. Appl. No. 13/264,594 in the name of Inoue et al., filed Oct. 14, 2011.
U.S. Appl. No. 13/264,884 in the name of Bisaiji et al., filed Oct. 17, 2011.

(56) References Cited

OTHER PUBLICATIONS

U.S. Appl. No. 13/375,674 in the name of Inoue et al., filed Dec. 1, 2011.
U.S. Appl. No. 13/578,148 in the name of Umemoto et al., filed Aug. 9, 2012.
U.S. Patent Application No. 13/58,186 in the name of Kazuhiro Umemoto et al., filed Aug. 24, 2012.
U.S. Appl. No. 13/582,862 in the name of Uenishi et al., filed Sep. 5, 2012.
U.S. Appl. No. 13/582,909 in the name of Kazuhiro Umemoto et al., filed Sep. 5, 2012.
U.S. Patent Application No. 131202,694 in the name of Bisaui et al., filed Sep. 19, 2011.
U.S. Appl. No. 14/108,113 in the name of Bisaiji et al., filed Dec. 16, 2013.
U.S. Appl. No. 14/152,629 in the name of Umemoto et al., filed Jan. 10, 2014.
U.S. Appl. No. 13/262,001 in the name of Inoue et al., filed Oct. 19, 2011.
Nov. 22, 2010 Written Opinion issued in International Patent Application No. PCT/JP2010/065186 (with translation).
Aug. 6, 2014 Notice of Allowance in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
Jun. 15, 2010 International Search Report issued in PCT/JP2010/054740 (with translation).
Jun. 15, 2010 International Search Report issued in International Patent Application No. PCT/JP2010/054731 (with translation).
Jun. 29, 2010 International Search Report issued in International Patent Application No. PCT/JP2010/056345.
Jun. 15, 2010 International Search Report issued in International Patent Application No. PCT/JP2010/054729.
Sep. 13, 2011 International Search Report issued in International Patent Application No. PCT/JP2011/066628 (with translation).
Jun. 20, 2012 Search Report issued in European Patent Application No. 10845966.0.
Apr. 4, 2013 Office Action issued in U.S. Appl. No. 13/255,710.
Oct. 24, 2013 Office Action issued in U.S. Appl. No. 13/255,710.
Jan. 17, 2013 Office Action issued in U.S. Appl. No. 13/202,733.
Jan. 22, 2014 Office Action issued in U.S. Appl. No. 13/499,211.
May 27, 2014 Office Action issued in U.S. Appl. No. 13/255,710.
Oct. 2, 2014 Office Action issued in U.S. Appl. No. 13/582,862.
Jun. 15, 2010 Written Opinion issued in PCT/JP2010/054740 (with translation).
Sep. 18, 2014 Notice of Allowance issued in U.S. Appl. No. 13/255,710.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/255,774 in the name of Bisaiji et al., filed Sep. 22, 2011.
U.S. Appl. No. 13/255,710 in the name of Bisaiji et al., filed Oct. 12, 2011.
U.S. Appl. No. 13/502,210 in the name of Bisaiji et al., filed Apr. 16, 2012.
U.S. Appl. No. 13/499,211 in the name of Bisaiji et al., filed Mar. 29, 2012.
U.S. Appl. No. 13/934,080 in the name of Bisaiji et al., filed Jul. 2, 2013.
U.S. Appl. No. 13/262,506 in the name of Bisaiji et al., filed Sep. 30, 2011.
U.S. Appl. No. 13/264,230 in the name of Bisaiji et al., filed Oct. 13, 2011.
U.S. Appl. No. 13/202,694 in the name of Bisaiji et al., filed Sep. 19, 2011.
Dec. 22, 2014 Office Action issued in U.S. Appl. No. 13/264,230.

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine in which a hydrocarbon feed valve for feeding hydrocarbons is arranged inside of an engine exhaust passage, an exhaust purification catalyst for reacting $NO_x$ contained in exhaust gas and reformed hydrocarbons is arranged inside of the engine exhaust passage downstream of the hydrocarbon feed valve, the exhaust purification catalyst is comprised of an upstream-side catalyst and a downstream-side catalyst arranged in series at an interval from each other, the upstream-side catalyst has a smaller cross-sectional area than the downstream-side catalyst and has a function of at least reforming hydrocarbons which are fed from the hydrocarbon feed valve, a precious metal catalyst is carried on an exhaust flow surface of at least one catalyst of the upstream-side catalyst and the downstream-side catalyst and a basic exhaust gas flow surface part is formed around the precious metal catalyst, the exhaust purification catalyst has a property of reducing the $NO_x$ which is contained in exhaust gas if a concentration of hydrocarbons which flow to the upstream-side catalyst is made to vibrate by within a predetermined range of amplitude and within a predetermined range of period and has a property of being increased in storage amount of $NO_x$ which is contained in exhaust gas if the vibration period of the hydrocarbon concentration is made longer than the predetermined range, and, at the time of engine operation, the concentration of hydrocarbons which flow to the upstream-side catalyst is made to vibrate by within the above predetermined range of amplitude and within the above predetermined range of period to thereby reduce $NO_x$ which is contained in exhaust gas in the exhaust purification catalyst.

Advantageous Effects of Invention

Even if the temperature of the exhaust purification catalyst becomes a high temperature, a high $NO_x$ purification rate can be obtained.

DESCRIPTION OF EMBODIMENTS

Figure 1:
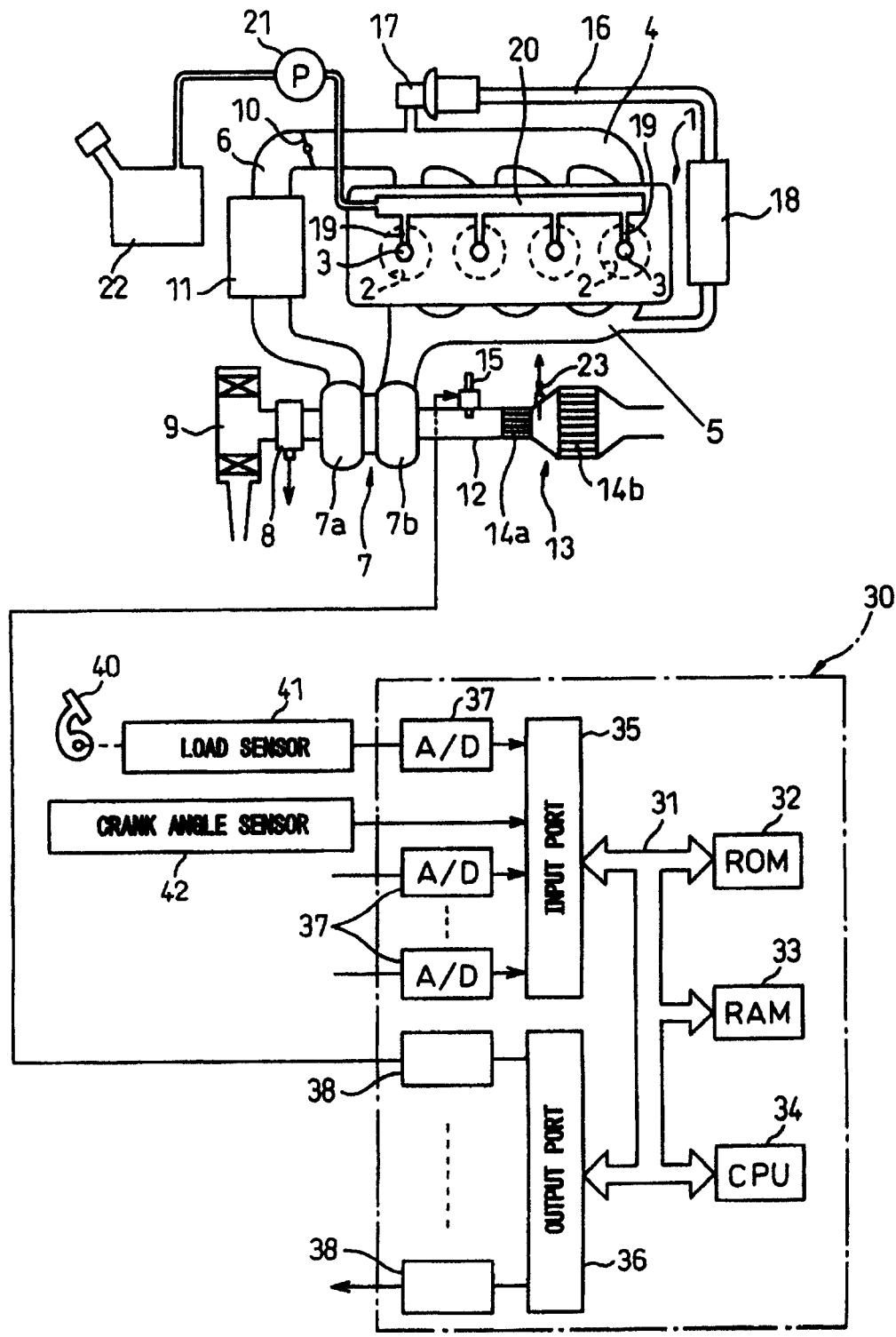
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to an exhaust purification catalyst 13. As shown in FIG. 1, this exhaust purification catalyst 13 is comprised of an upstream-side catalyst 14a and a downstream-side catalyst 14b arranged in series at an interval from each other. The upstream-side catalyst 14a has a smaller cross-sectional area than the downstream-side catalyst 14b'.

Inside the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the upstream-side catalyst 14a, a temperature sensor 23 is attached for estimating a temperature of the upstream-side catalyst 14a and a temperature of an upstream end of the upstream-side catalyst 14a. The output signals of this temperature sensor 23 and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, step motor for driving the throttle valve 10, hydrocarbon feed valve 15, EGR control valve 17, and fuel pump 21.

Figure 2:
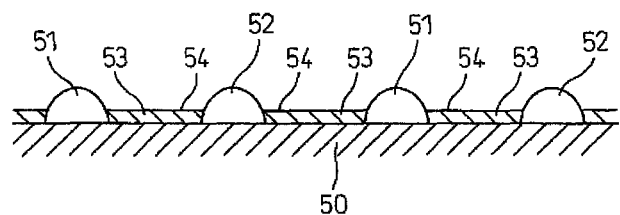
FIG. 2 is a view schematically showing a surface part of a catalyst carrier.

In a first embodiment according to the present invention, the upstream-side catalyst 14a and downstream-side catalyst 14b are formed from the same catalyst. FIG. 2 schematically shows the surface part of the catalyst carrier carried on the substrate of the upstream-side catalyst 14a and downstream-side catalyst 14b. In these upstream-side catalyst 14a and downstream-side catalyst 14b, as shown in FIG. 2, for example, precious metal catalysts 51 and 52 are carried on a catalyst carrier 50 comprised of alumina. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the upstream-side catalyst 14a and downstream-side catalysts 4b. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the upstream-side catalyst 14a and downstream-side catalyst 14b, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
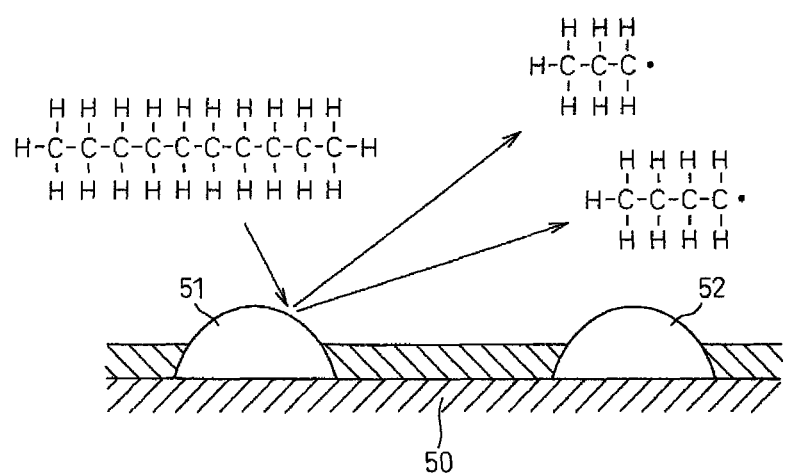
FIG. 3 is a view for explaining an oxidation reaction in an exhaust purification catalyst.

If hydrocarbons are injected from the hydrocarbon feed valve 15 into the exhaust gas, the hydrocarbons are reformed at the upstream-side catalyst 14a. In the present invention, at this time, the reformed hydrocarbons are used to remove the $NO_x$ at the downstream-side catalyst 14b. FIG. 3 schematically shows the modification action performed at the upstream-side catalyst 14a at this time. As shown in FIG. 3, the hydrocarbons HC which are injected from the hydrocarbon feed valve 15 become radical hydrocarbons HC with a small carbon number by the catalyst 51.

Figure 4:
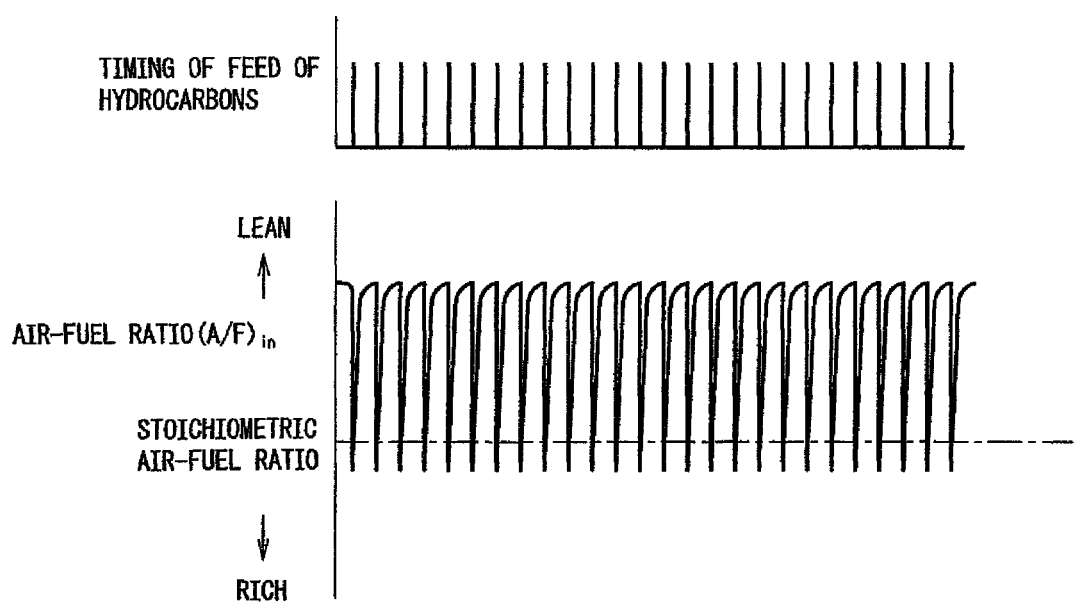
FIG. 4 is a view showing a change of an air-fuel ratio of exhaust gas flowing into an exhaust purification catalyst.

FIG. 4 shows the timing of feeding hydrocarbons from the hydrocarbon feed valve 15 and the changes in the air-fuel ratio (A/F)in of the exhaust gas flowing into the upstream-side catalyst 14a. Note that, the changes in the air-fuel ratio (A/F)in depend on the change in concentration of the hydrocarbons in the exhaust gas which flows into the upstream-side catalyst 14a, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
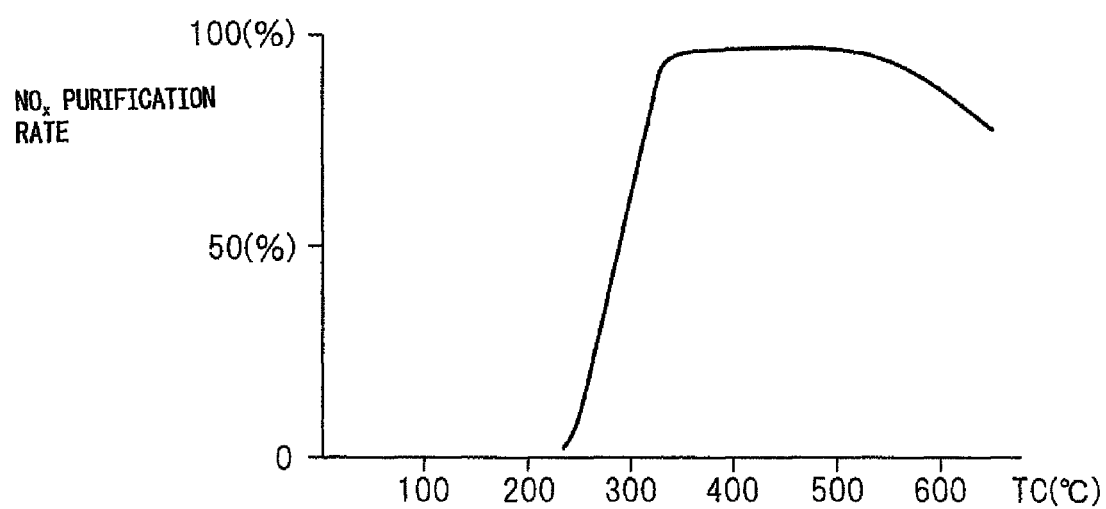
FIG. 5 is a view showing an $NO_x$ purification rate.

FIG. 5 shows the $NO_x$ purification rate by the exhaust purification catalyst 13 with respect to the catalyst temperatures TC of the upstream-side catalyst 14a when periodically making the concentration of hydrocarbons flowing into the upstream-side catalyst 14a change so as to, as shown in FIG. 4, make the air-fuel ratio (A/F)in of the exhaust gas flowing to the upstream-side catalyst 14a change. The inventors engaged in research relating to $NO_x$ purification for a long time. In the process of research, they learned that if making the concentration of hydrocarbons flowing into the upstream-side catalyst 14a vibrate by within a predetermined range of amplitude and within a predetermined range of period, as shown in FIG. 5, an extremely high $NO_x$ purification rate is obtained even in a 400° C. or higher high temperature region.

Figure 6A:
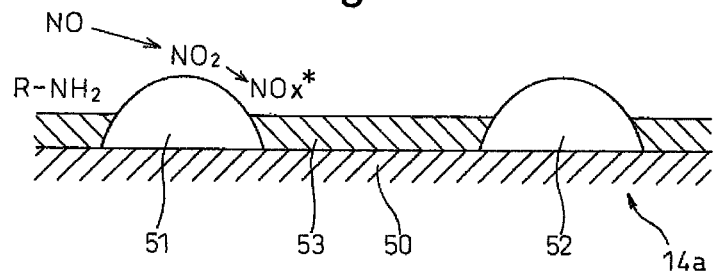
FIGS. 6A, 6B, and 6C are views for explaining an oxidation reduction reaction in an exhaust purification catalyst.
Figure 6B:
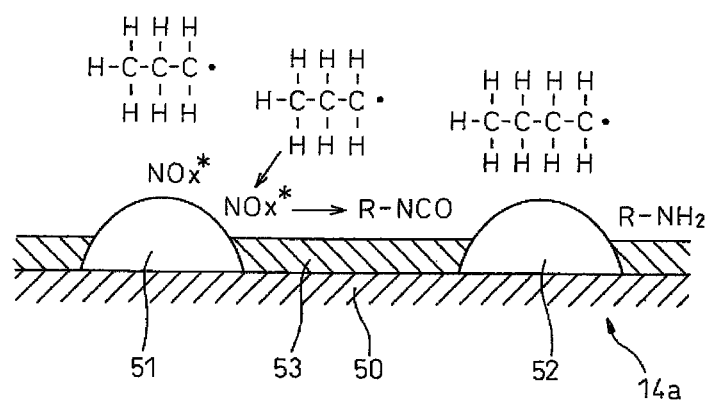
Figure 6C:
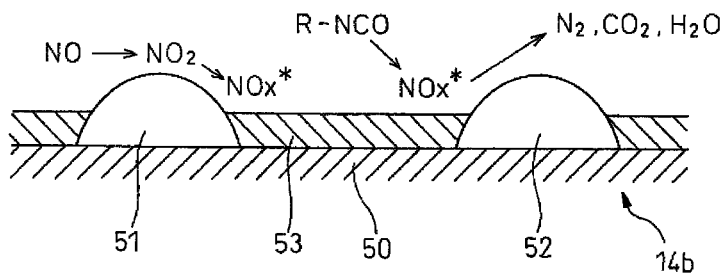

Furthermore, at this time, a large amount of reducing intermediate containing nitrogen and hydrocarbons continues to be held or adsorbed on the surface of the basic layer 53 of the upstream-side catalyst 14a, that is, on the basic exhaust gas flow surface part 54 of the upstream-side catalyst 14a. It is learned that this reducing intermediate plays a central role in obtaining a high $NO_x$ purification rate. Next, this will be explained with reference to FIGS. 6A, 6B, and 6C. Note that, FIGS. 6A and 6B schematically show the surface part of the catalyst carrier 50 of the upstream-side catalyst 14a, while FIG. 6C schematically shows the surface part of the catalyst carrier 50 of the downstream-side catalyst 14b. These FIGS. 6A, 6B, and 6C show the reaction which is presumed to occur when the concentration of hydrocarbons flowing into the upstream-side catalyst 14a is made to vibrate by within a predetermined range of amplitude and within a predetermined range of period.

FIG. 6A shows when the concentration of hydrocarbons flowing into the upstream-side catalyst 14a is low, while FIG. 6B shows when hydrocarbons are fed from the hydrocarbon feed valve 15 and the concentration of hydrocarbons flowing into the upstream-side catalyst 14a becomes high.

Now, as will be understood from FIG. 4, the air-fuel ratio of the exhaust gas which flows into the upstream-side catalyst 14a is maintained lean except for an instant, so the exhaust gas which flows into the upstream-side catalyst 14a normally becomes a state of oxygen excess. Therefore, the NO which is contained in the exhaust gas, as shown in FIG. 6A, is oxidized on the platinum 51 and becomes $NO_2$. Next, this $NO_2$ is further oxidized and becomes $NO_3$. Further part of the $NO_2$ becomes $NO_2^-$. In this case, the amount of production of $NO_3$ is far greater than the amount of production of $NO_2^-$. Therefore, on the platinum Pt 51, a large amount of $NO_3$ and a small amount of $NO_2^-$ are produced. These $NO_3$ and $NO_2^-$ are strong in activity. Below, these $NO_3$ and $NO_2^-$ will be referred to as the active $NO_x^*$.

On the other hand, if hydrocarbons are fed from the hydrocarbon feed valve 15, as shown in FIG. 3, the hydrocarbons are reformed and become radicalized inside of the upstream-side catalyst 14a. As a result, as shown in FIG. 6B, the hydrocarbon concentration around the active $NO_x^*$ becomes higher. In this regard, after the active $NO_x^*$ is produced, if the state of a high oxygen concentration around the active $NO_x^*$ continues for a predetermined time or more, the active $NO_x^*$ is oxidized and is absorbed in the basic layer 53 in the form of nitrate ions $NO_3^-$. However, if the hydrocarbon concentration around the active $NO_x^*$ is made higher before this predetermined time passes, as shown in FIG. 6B, the active $NO_x^*$ reacts on the platinum 51 with the radical hydrocarbons HC whereby a reducing intermediate is produced on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate which is produced on the surface of the basic layer 53 is believed to be the isocyanate compound R—NCO and amine compound R—$NH_2$. The reducing intermediate R—NCO or R—$NH_2$ which is produced at the upstream-side catalyst 14a is sent to the downstream-side catalyst 14b.

On the other hand, the cross-sectional area of the downstream-side catalyst 14b is larger than the cross-sectional area of the upstream-side catalyst 14a. Therefore, even if the air-fuel ratio of the exhaust gas which flows out from the upstream-side catalyst 14a becomes rich for an instant, this rich gas will disperse before flowing into the downstream-side catalyst 14b, therefore the air-fuel ratio of the exhaust gas which flows into the downstream-side catalyst 14b is maintained constantly lean. Therefore, as shown in FIG. 6C, on the downstream-side catalyst 14b, active $NO_x^*$ is actively produced. Further, part of the active $NO_x^*$ produced at the upstream-side catalyst 14a, flows out from the upstream-side catalyst 14a, flows into the downstream-side catalyst 14b, and sticks or adheres to the surface of the basic layer 53 of the downstream-side catalyst 14b. Therefore, a large amount of active $NO_x^*$ is held inside the downstream-side catalyst 14b.

On the other hand, as explained before, a large amount of reducing intermediate is sent from the upstream-side catalyst 14a to the downstream-side catalyst 14b. The reducing intermediate R—NCO or R—$NH_2$, as shown in FIG. 6C, reacts with the active $NO_x^*$ which is held in the downstream-side catalyst 14b and becomes $N_2$, $CO_2$, and $H_2O$, therefore the $NO_x$ is removed.

In this way, in the exhaust purification catalyst 13, by making the concentration of hydrocarbons flowing into the upstream-side catalyst 14a temporarily higher and producing a reducing intermediate, the active $NO_2^*$ reacts with the reducing intermediate and the $NO_x$ is removed. That is, in order for the exhaust purification catalyst 13 to remove the $NO_x$, the concentration of hydrocarbons flowing into the upstream-side catalyst 14a has to be periodically changed.

Of course, in this case, it is necessary to raise the concentration of hydrocarbons to a concentration sufficiently high for producing the reducing intermediate. That is, it is necessary to make the concentration of hydrocarbons flowing into the upstream-side catalyst 14a vibrate by within a predetermined range of amplitude.

On the other hand, if lengthening the feed period of the hydrocarbons, the time in which the oxygen concentration becomes higher becomes longer in the period after the hydrocarbons are fed until the hydrocarbons are next fed. Therefore, the active $NO_x^*$ is absorbed in the basic layer 53 in the form of nitrates without producing a reducing intermediate. To avoid this, it is necessary to make the concentration of hydrocarbons flowing into the exhaust purification catalyst 13 vibrate by within a predetermined range of period. Incidentally, in the example shown in FIG. 4, the injection interval is made 3 seconds.

Figure 7A:
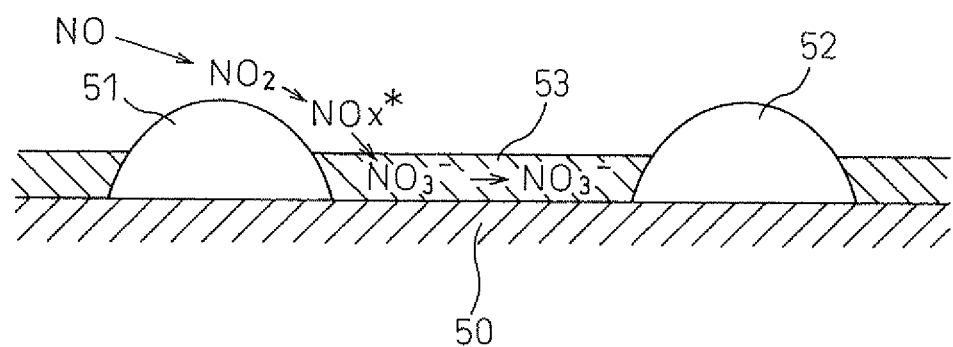
FIGS. 7A and 7B are views for explaining an oxidation reduction reaction in an exhaust purification catalyst.

As mentioned above, if making the vibration period of the hydrocarbon concentration, that is, the feed period of the hydrocarbons HC, longer than a predetermined range of period, the active $NO_x{}^*$ which is produced on the platinum Pt 53, as shown in FIG. 7A, will diffuse in the form of nitrate ions $NO_3{}^-$ inside the basic layer 53 and become nitrates. That is, at this time, the $NO_x$ in the exhaust gas is absorbed in the form of nitrates inside of the basic layer 53.

Figure 7B:
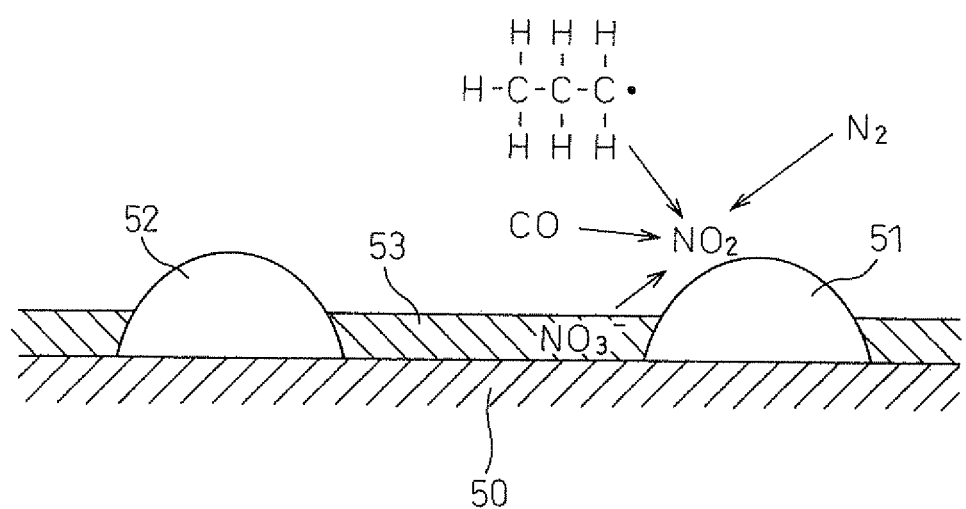

On the other hand, FIG. 7B shows the case when $NO_x$ is absorbed in the form of nitrates inside the basic layer 53 in this way, the air-fuel ratio of the exhaust gas which flows into the upstream-side catalyst 14a is made the stoichiometric air-fuel ratio or rich. In this case, the oxygen concentration in the exhaust gas falls, so the reaction proceeds in the opposite direction ($NO_3{}^- \rightarrow NO_2$), and consequently the nitrates absorbed in the basic layer 53 become nitrate ions $NO_3{}^-$ one by one and, as shown in FIG. 7B, are released from the basic layer 53 in the form of $NO_2$. Next, the released $NO_2$ is reduced by the hydrocarbons HC and CO contained in the exhaust gas.

Figure 8:
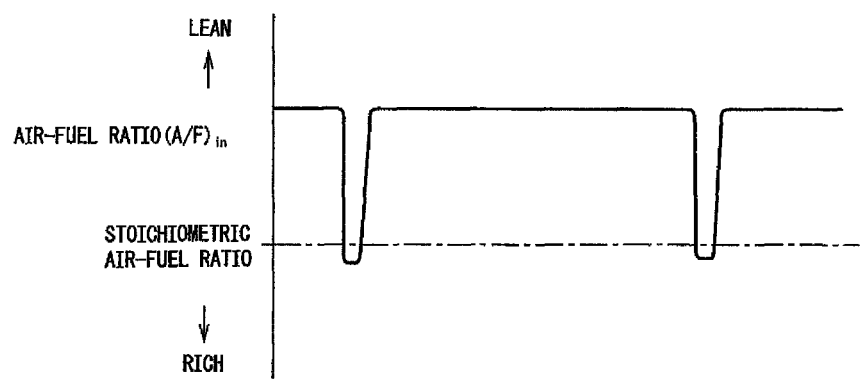
FIG. 8 is a view showing a change of an air-fuel ratio of exhaust gas flowing into an exhaust purification catalyst.

FIG. 8 shows the case of making the air-fuel ratio (A/F)in of the exhaust gas which flows into the upstream-side catalyst 14a temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of storage as a term including both absorption and adsorption, at this time, the basic layer 53 performs the role of an $NO_x$ storage agent for temporarily storing the $NO_x$. That is, in this case, if referring to the ratio of air and fuel (hydrocarbons) which are fed into the engine intake passage, combustion chambers 2, and exhaust passage upstream of the upstream-side catalyst 14a as the air-fuel ratio of the exhaust gas, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
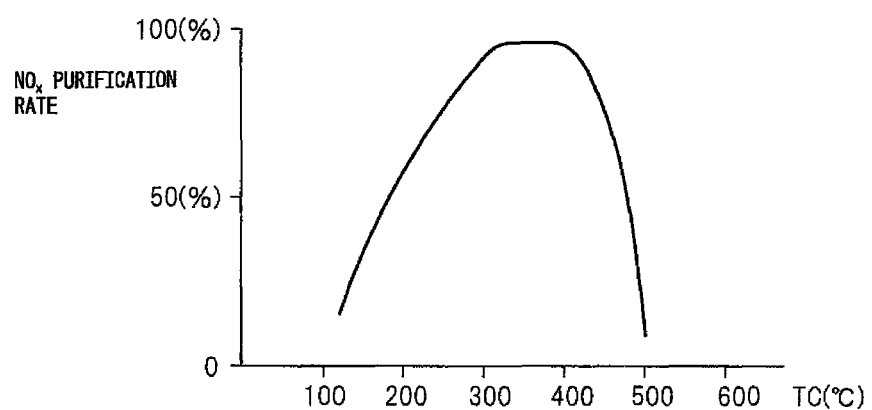
FIG. 9 is a view of an $NO_x$ purification rate.

FIG. 9 shows the $NO_x$ purification rate when making the exhaust purification catalyst 13 function as an $NO_x$ storage catalyst in this way. Note that, the abscissa of the FIG. 9 shows the catalyst temperature TC of the upstream-side catalyst 14a. When making the exhaust purification catalyst 13 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in a first embodiment according to the present invention, a hydrocarbon feed valve 15 for feeding hydrocarbons is arranged inside of an engine exhaust passage, an exhaust purification catalyst 13 for reacting $NO_x$ contained in exhaust gas and reformed hydrocarbons is arranged inside of the engine exhaust passage downstream of the hydrocarbon feed valve 15, the exhaust purification catalyst 13 is comprised of an upstream-side catalyst 14a and downstream-side catalyst 14b arranged in series at an interval from each other, the upstream-side catalyst 14a has a smaller cross-sectional area than the downstream-side catalyst 14b and has the function of reforming the hydrocarbons which are fed from the hydrocarbon feed valve 15, precious metal catalysts 51 and 52 are carried on the exhaust gas flow surface of the upstream-side catalyst 14a and downstream-side catalyst 14b and a basic exhaust gas flow surface part 54 is formed around the precious metal catalysts 51 and 52, the exhaust purification catalyst 13 has the property of reducing the $NO_x$ which is contained in exhaust gas if the concentration of hydrocarbons which flow into the upstream-side catalyst 14a is made to vibrate by within a predetermined range of amplitude and within a predetermined range of period and has the property of being increased in storage amount of $NO_x$ which is contained in exhaust gas if the vibration period of the hydrocarbon concentration is made longer than this predetermined range, and, at the time of engine operation, the concentration of hydrocarbons which flow into the upstream-side catalyst 14a is made to vibrate by within the predetermined range of amplitude and within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries precious metal catalysts and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. Note that, this new $NO_x$ purification method will be referred to below as the first $NO_x$ purification method.

Next, referring to FIG. 10 to FIG. 15, this first $NO_x$ purification method will be explained in a bit more detail.

Figure 10:
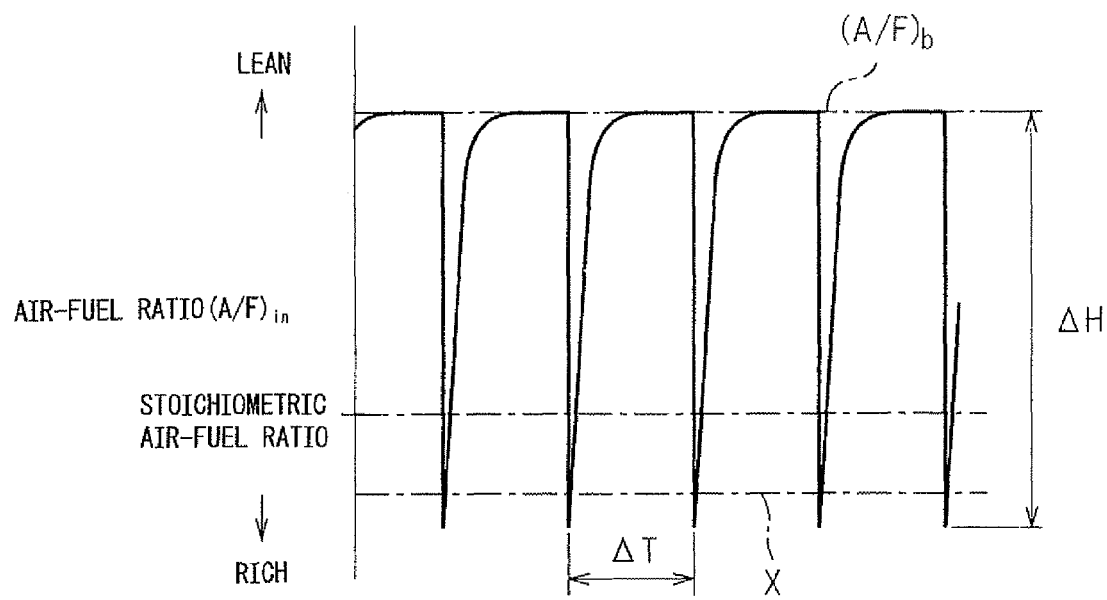
FIG. 10 is a time chart showing a change of an air-fuel ratio of exhaust gas flowing into an exhaust purification catalyst.

FIG. 10 shows enlarged the change in the air-fuel ratio (A/F)in shown in FIG. 4. Note that, as explained before, the change of the air-fuel ratio (A/F)in of the exhaust gas which flows into the upstream-side catalyst 14a simultaneously shows the change in the concentration of hydrocarbons which flow into the upstream-side catalyst 14a. Note that, in FIG. 10, ΔH shows the amplitude of the change in concentration of hydrocarbons HC which flow into the upstream-side catalyst 14a, while ΔT shows the vibration period of the concentration of the hydrocarbons which flow into the upstream-side catalyst 14a.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the upstream-side catalyst 14a when stopping the feed of hydrocarbons. On the other hand, in FIG. 10, X shows the upper limit of the air-fuel ratio (A/F)in used for producing the reducing intermediate without the produced active $NO_x^*$ being stored in the form of nitrates inside the basic layer 53 much at all, To make the active $NO_x^*$ and the reformed hydrocarbons react to produce a reducing intermediate, the air-fuel ratio (A/F)in has to be made lower than this upper limit X of the air-fuel ratio.

In other words, in FIG. 10, X shows the lower limit of the concentration of hydrocarbons required for making the active $NO_x^*$ and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_x^*$, that is, the air-fuel ratio (A/F)in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F)in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F)in is maintained lean while periodically reducing the air-fuel ratio (A/F)in so as to form the reducing intermediate.

In this case, whether the demanded minimum air-fuel ratio X becomes rich or becomes lean depends on the oxidizing strength of the upstream-side catalyst 14a. In this case, the upstream-side catalyst 14a, for example, becomes stronger in oxidizing strength if increasing the carried amount of the precious metal 51 and becomes stronger in oxidizing strength if strengthening the acidity. Therefore, the oxidizing strength of the upstream-side catalyst 14a changes due to the carried amount of the precious metal 51 or the strength of the acidity.

Figure 11:
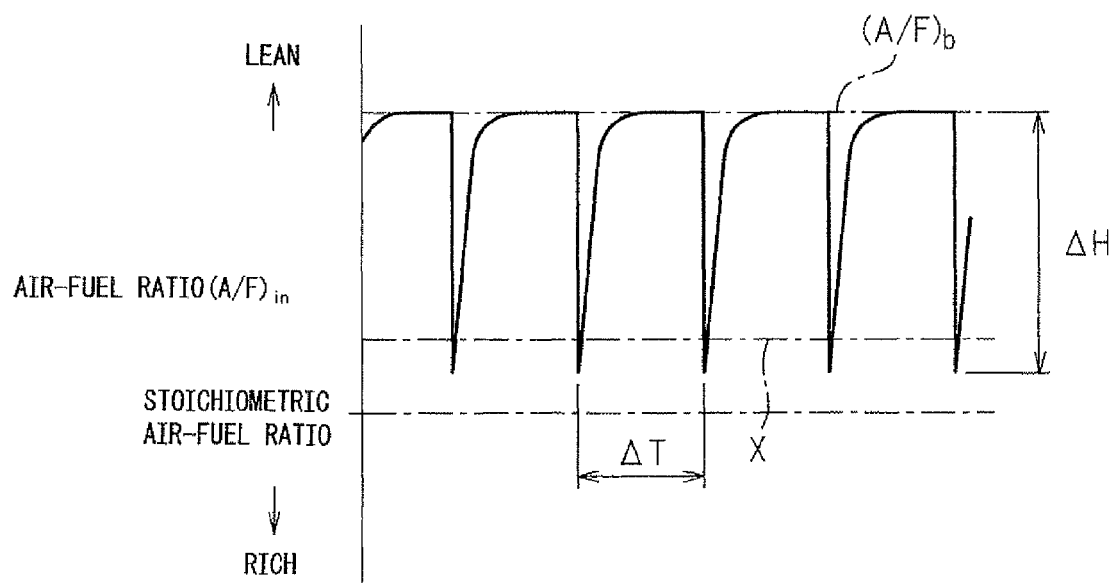
FIG. 11 is a time chart showing a change of an air-fuel ratio of exhaust gas flowing into an exhaust purification catalyst.

Now, if using an upstream-side catalyst 14a with a strong oxidizing strength, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, the reducing intermediate can no longer be produced. As opposed to this, when using an upstream-side catalyst 14a with a strong oxidizing strength, as shown in FIG. 10, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an upstream-side catalyst 14a with a strong oxidizing strength, the demanded minimum air-fuel ratio X has to be made rich.

On the other hand, when using an upstream-side catalyst 14a with a weak oxidizing strength, as shown in FIG. 11, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an upstream-side catalyst 14a with a weak oxidizing strength, as shown in FIG. 10, if making the air-fuel ratio (A/F)in periodically rich, a large amount of hydrocarbons will be exhausted from the upstream-side catalyst 14a without being oxidized and consequently the amount of hydrocarbons which is wastefully consumed will increase.

Therefore, when using an upstream-side catalyst 14a with a weak oxidizing strength, the demanded minimum air-fuel ratio X has to be made lean.

Figure 12:
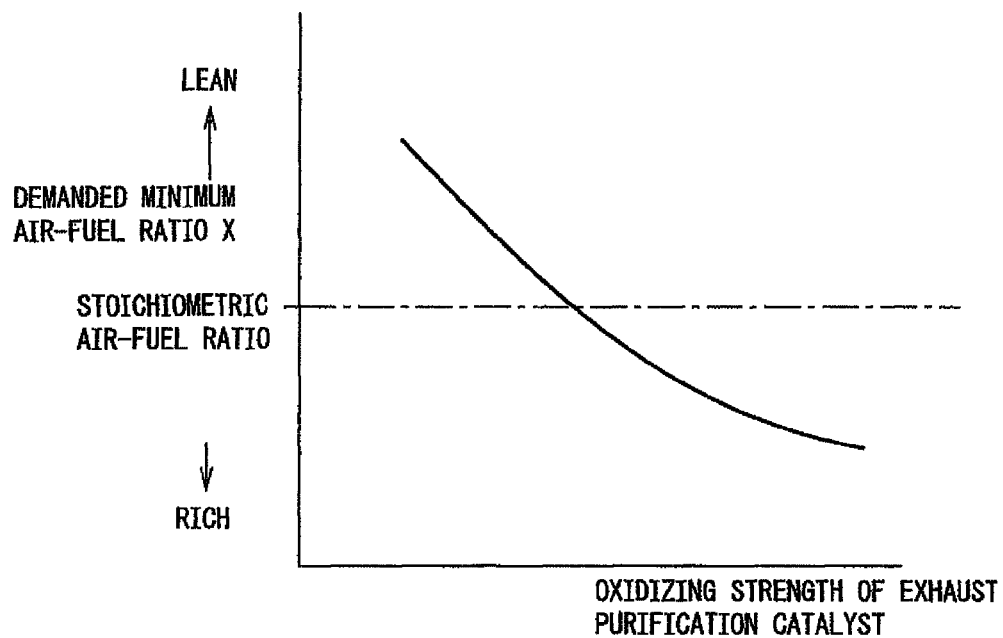
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, has to be reduced the stronger the oxidizing strength of the upstream-side catalyst 14a. In this way, the demanded minimum air-fuel ratio X becomes lean or rich due to the oxidizing strength of the upstream-side catalyst 14a. Below, taking as example the case where the demanded minimum air-fuel ratio X is rich, the amplitude of the change in concentration of hydrocarbons flowing into the upstream-side catalyst 14a and the vibration period of the concentration of hydrocarbons flowing into the upstream-side catalyst 14a will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases. Therefore, the higher the oxygen concentration in the exhaust gas before the hydrocarbons are fed, the larger the amplitude of the hydrocarbon concentration has to be made.

Figure 13:
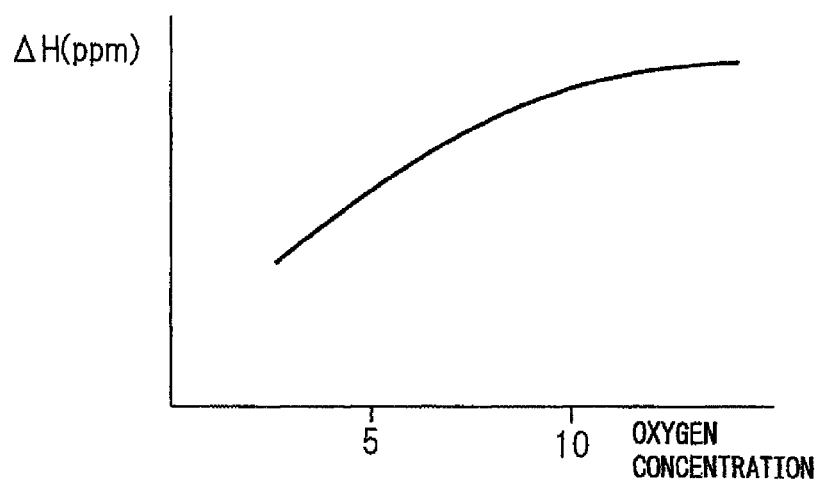
FIG. 13 is a view showing a relationship between an oxygen concentration in exhaust gas and an amplitude ΔH of a hydrocarbon concentration giving the same $NO_x$ purification rate.

FIG. 13 shows the relationship between the oxygen concentration in the exhaust gas before the hydrocarbons are fed and the amplitude ΔH of the hydrocarbon concentration when the same $NO_x$ purification rate is obtained. From FIG. 13, it is learned that, to obtain the same $NO_x$ purification rate, the higher the oxygen concentration in the exhaust gas before the hydrocarbons are fed, the greater the amplitude ΔH of the hydrocarbon concentration has to be made. That is, to obtain the same $NO_x$ purification rate, the higher the base air-fuel ratio (A/F)b, the greater the amplitude ΔT of the hydrocarbon concentration has to be made. In other words, to remove the $NO_x$ well, the lower the base air-fuel ratio (A/F)b, the more the amplitude ΔT of the hydrocarbon concentration can be reduced.

Figure 14:
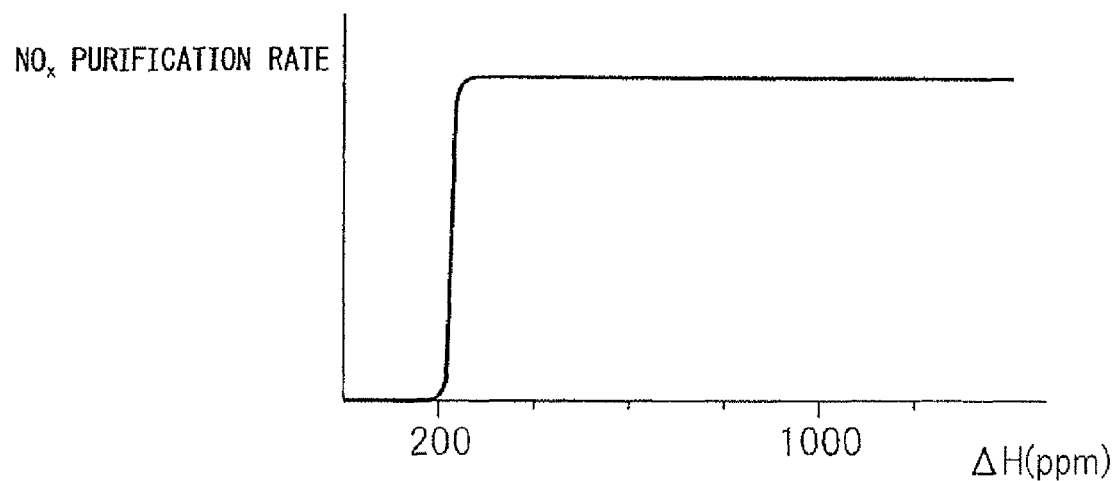
FIG. 14 is a view showing a relationship between an amplitude ΔH of a hydrocarbon concentration and an $NO_x$ purification rate.

In this regard, the base air-fuel ratio (A/F)b becomes the lowest at the time of an acceleration operation. At this time, if the amplitude ΔH of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude ΔH of the hydrocarbon concentration is 200 ppm or more, an excellent $NO_x$ purification rate can be obtained.

On the other hand, it is learned that when the base air-fuel ratio (A/F)b is the highest, if making the amplitude ΔH of the hydrocarbon concentration 10000 ppm or so, an excellent $NO_x$ purification rate is obtained. Therefore, in the present invention, the predetermined range of the amplitude of the hydrocarbon concentration is made 200 ppm to 10000 ppm.

Figure 15:
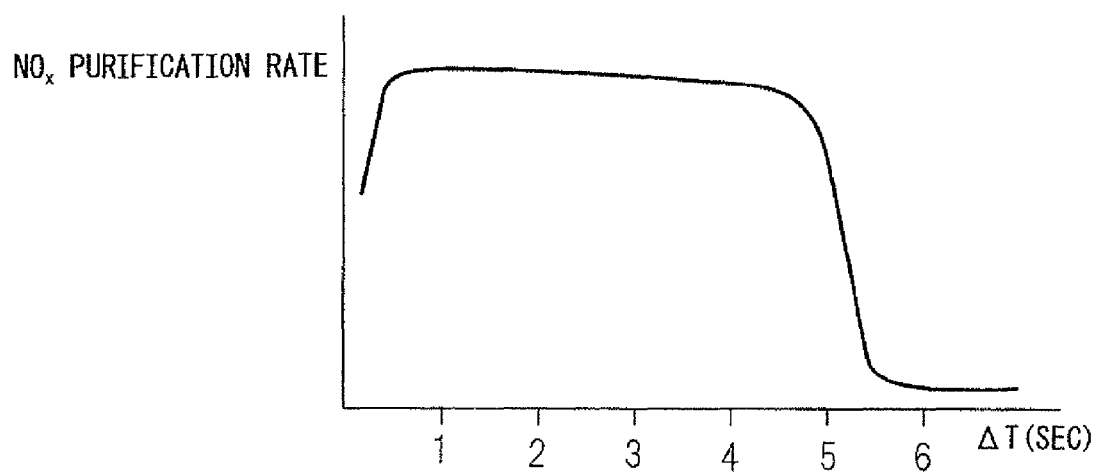
FIG. 15 is a view showing a relationship of a vibration period ΔT of a hydrocarbon concentration and an $NO_x$ purification rate.

Further, if the vibration period ΔT of the hydrocarbon concentration becomes longer, the oxygen concentration around the active $NO_x^*$ becomes higher in the time after the hydrocarbons are fed to when the hydrocarbons are next fed. In this case, if the vibration period ΔT of the hydrocarbon concentration becomes longer than about 5 seconds, the majority of the active $NO_x^*$ starts to be absorbed in the form of nitrates inside the basic layer 53. Therefore, as shown in FIG. 15, if the vibration period ΔT of the hydrocarbon concentration becomes longer than about 5 seconds, the $NO_x$ purification rate falls. Therefore, the vibration period ΔT of the hydrocarbon concentration has to be made 5 seconds or less.

On the other hand, if the vibration period ΔT of the hydrocarbon concentration becomes about 0.3 second or less, the fed hydrocarbons start to build up on the exhaust gas flow surface of the upstream-side catalyst 14a, therefore, as shown in FIG. 15, if the vibration period ΔT of the hydrocarbon concentration becomes about 0.3 second or less, the $NO_x$ purification rate falls. Therefore, in the present invention, the vibration period of the hydrocarbon concentration is made from 0.3 second to 5 seconds.

Figure 16:
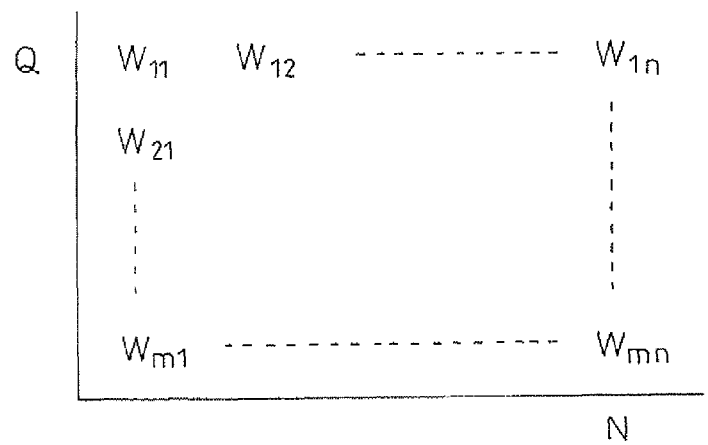
FIG. 16 is a view showing a map of the hydrocarbon feed amount W.

Now, in the present invention, by changing the hydrocarbon feed amount and injection timing from the hydrocarbon feed valve 15, the amplitude ΔH and vibration period ΔT of the hydrocarbons concentration is controlled so as to become the optimum values in accordance with the engine operating state. In this case, in this embodiment of the present invention, the hydrocarbon feed amount W able to give the optimum amplitude ΔH of the hydrocarbon concentration is stored as a function of the injection amount Q from the fuel injector 3 and engine speed N in the form of a map such as shown in FIG. 16 in advance in the ROM 32. Further, the optimum vibration amplitude ΔT of the hydrocarbon concentration, that is, the injection period ΔT of the hydrocarbons, is similarly stored as a function of the injection amount Q and engine speed N in the form of a map in advance in the ROM 32.

Next, referring to FIG. 17 to FIG. 20, an $NO_x$ purification method in the case when making the exhaust purification catalyst 13 function as an $NO_x$ storage catalyst will be explained in detail. The $NO_x$ purification method in the case when making the exhaust purification catalyst 13 function as an $NO_x$ storage catalyst in this way will be referred to below as the second $NO_x$ purification method.

Figure 17:
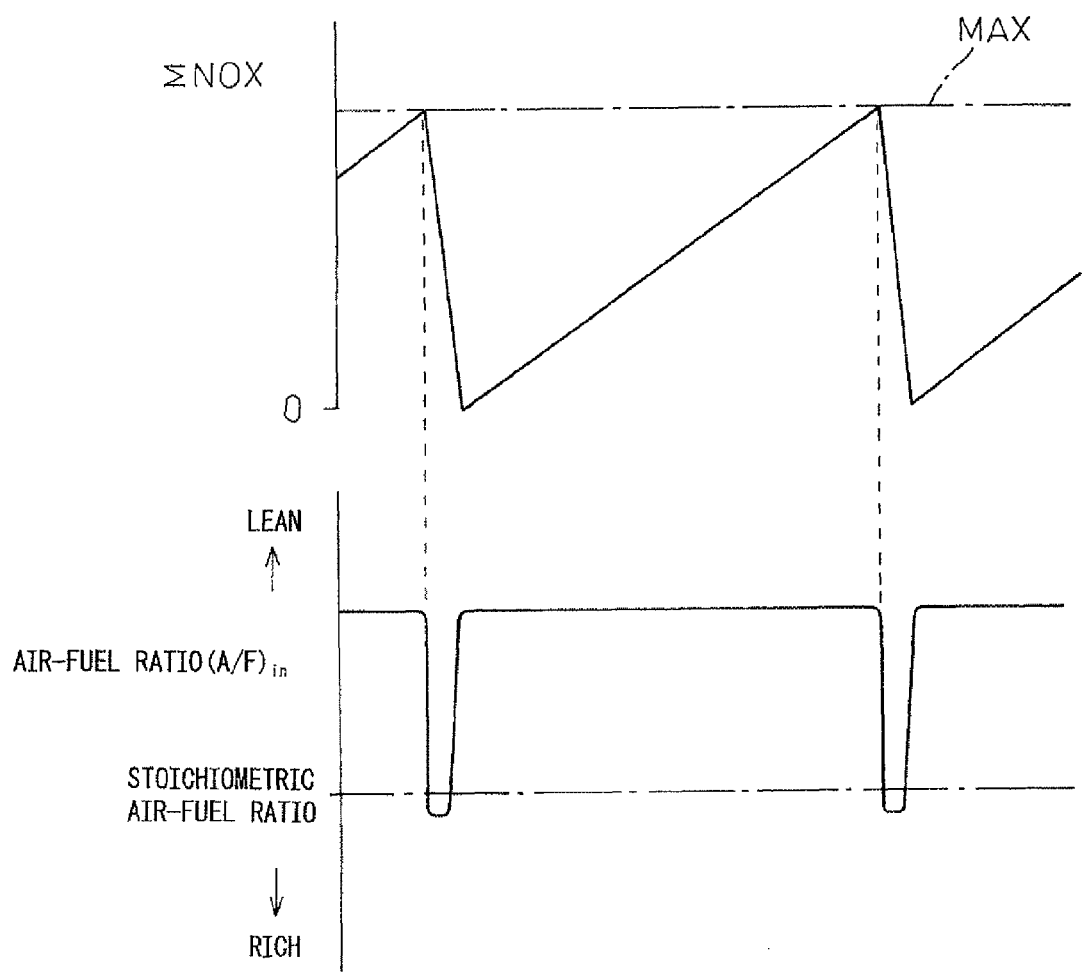
FIG. 17 is a view showing a change in the air-fuel ratio of the exhaust gas flowing to the exhaust purification catalyst etc.

In this second $NO_x$ purification method, as shown in FIG. 17, when the stored $NO_x$ amount $\Sigma NO_x$, which is stored in the basic layer 53 exceeds a predetermined allowable amount MAX, the air-fuel ratio (A/F)in of the exhaust gas which flows into the upstream-side catalyst 14a is temporarily made rich. If the air-fuel ratio (A/F)in of the exhaust gas is made rich, the $NO_x$ which was stored in the basic layer 53 when the air-fuel ratio (A/F)in of the exhaust gas was lean is released from the basic layer 53 all at once and reduced. Due to this, the $NO_x$ is removed.

Figure 18:
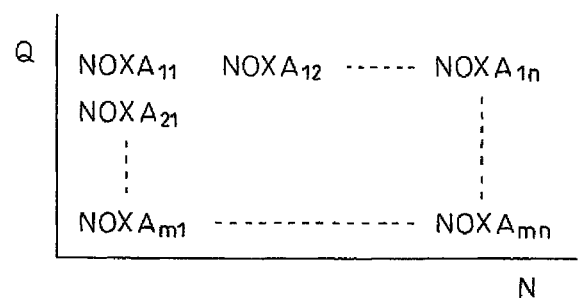
FIG. 18 is a view showing a map of an exhausted $NO_x$ amount NOXA.

The stored $NO_x$ amount $\Sigma NO_x$, is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 18 in advance in the ROM 32. The stored $NO_x$ amount $\Sigma NO_x$, is calculated from exhausted $NO_x$ amount NOXA. In this case, as explained before, the period in which the air-fuel ratio (A/F)in of the exhaust gas is made rich is usually 1 minute or more.

Figure 19:
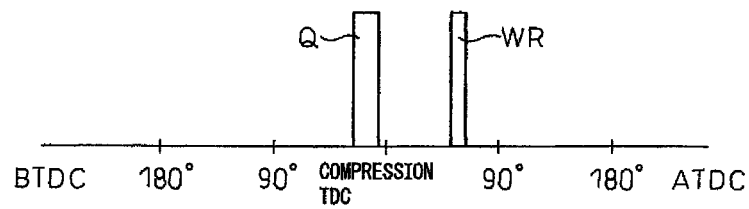
FIG. 19 is a view showing a fuel injection timing.
Figure 20:
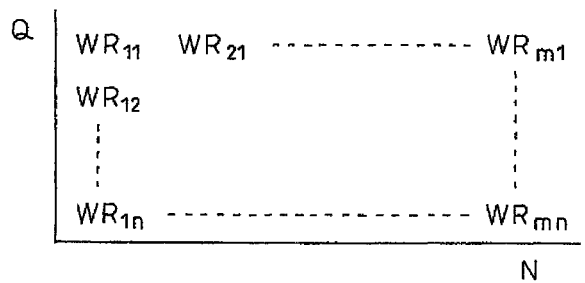
FIG. 20 is a view showing a map of a hydrocarbon feed amount WR.

In this second $NO_x$ purification method, as shown in FIG. 19, the fuel injector 3 injects additional fuel WR into the combustion chamber 2 in addition to the combustion-use fuel Q so that the air-fuel ratio (A/F)in of the exhaust gas flowing to the upstream-side catalyst 14a is made rich. Note that, in FIG. 19, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 20 in advance in the ROM 32. Of course, in this case, it is also possible to make the amount of feed of hydrocarbons from the hydrocarbon feed valve 15 increase so as to make the air-fuel ratio (A/F)in of the exhaust gas rich.

Figure 21A:
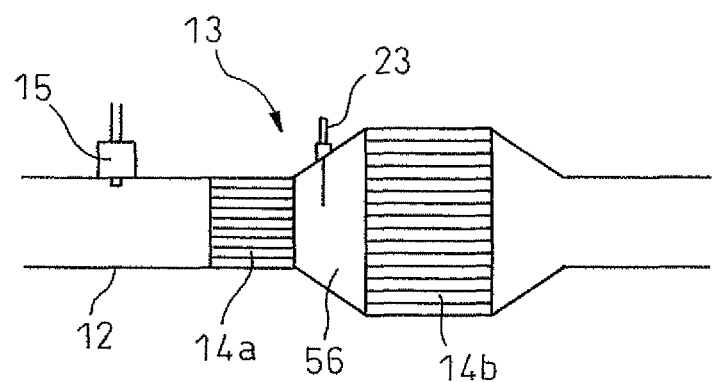
FIGS. 21A and 21B are view showing enlarged views of an exhaust purification catalyst.
Figure 21B:
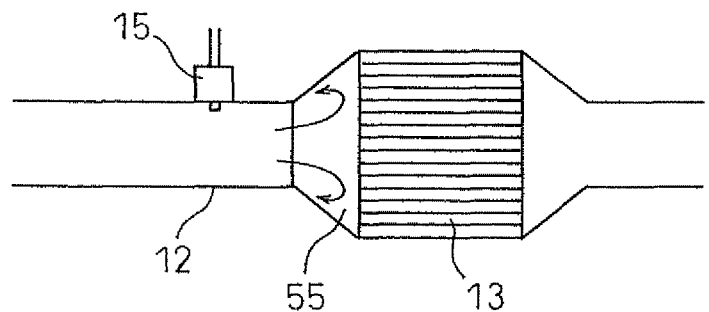

FIG. 21A shows an enlarged view of the surroundings of the exhaust purification catalyst 13 of FIG. 1a. Further, FIG. 21B is a view for explaining the functions of the exhaust purification catalyst 13 according to the present invention shown in FIG. 21A.

Now, as explained before, to produce the reducing intermediate, the air-fuel ratio (A/F)in of the exhaust gas flowing into the exhaust purification catalyst 13 has to be made the demanded minimum air-fuel ratio X or less. In this case, as shown in FIG. 21B, if an enlarged cross-section part 55 of the exhaust passage is formed in front of the exhaust purification catalyst 13, the flow of the exhaust gas will be disturbed inside this enlarged cross-section part 55, so the hydrocarbons which are injected from the hydrocarbon feed valve 15 will end up diffusing in the radial direction and the flow direction. As a result, the air-fuel ratio of the exhaust gas flowing into the exhaust purification catalyst 13 will end up greatly shifting to the lean side from the air-fuel ratio inside the exhaust pipe 12. Therefore, in this case, to make the air-fuel ratio (A/F)in of the exhaust gas flowing into the exhaust purification catalyst 13 the demanded minimum air-fuel ratio X or less requires that a large amount of hydrocarbons be fed.

In the present invention, to reduce the amount of feed of hydrocarbons required for making the air-fuel ratio (A/F)in of the exhaust gas the demanded minimum air-fuel ratio X or less, as shown in FIG. 21A, the exhaust purification catalyst 13 is comprised of the upstream-side catalyst 14a and downstream-side catalyst 14b arranged in series at an interval from each other, and the upstream-side catalyst 14a has a smaller cross-sectional area than the downstream-side catalyst 14b. If making the cross-sectional area of the upstream-side catalyst 14a smaller in this way, the degree of diffusion of the fed hydrocarbons in the exhaust gas which flows into the upstream-side catalyst 14a becomes weaker, so it becomes possible to reduce the amount of feed of the hydrocarbons required for making the air-fuel ratio (A/F)in of the exhaust gas the demanded minimum air-fuel ratio X or less.

Note that, if making the diameter of the exhaust purification catalyst 13 as a whole smaller, it would be necessary to make the total length of the exhaust purification catalyst 13 greater. As a result, at the downstream side of the catalyst, the problem would arise of the catalyst temperature greatly falling. No only that, the problem would arise of the exhaust resistance greatly increasing. Therefore, in the present invention, to prevent these problems from arising, the diameter of the downstream-side catalyst 14b is made larger and, as shown in FIG. 21A, an enlarged cross-section part 56 of the exhaust passage is formed between the upstream-side catalyst 14a and downstream-side catalyst 14b.

That is, in the present invention, the air-fuel ratio of the exhaust gas which flows to the downstream-side catalyst 14b has not to be made the demanded minimum air-fuel ratio X or less. To produce $NO_x^*$, that is, to raise the $NO_x$ purification rate, it is necessary to maintain the air-fuel ratio of the exhaust gas which flows into the downstream-side catalyst 14b lean. Therefore, as shown in FIG. 21A, it can be said to be preferable to form the enlarged cross-section part 56 between the upstream-side catalyst 14a and downstream-side catalyst 14b.

On the other hand, to prevent diffusion of the hydrocarbons which are injected from the hydrocarbon feed valve 15, it is necessary to prevent disturbance of the flow of exhaust gas flowing to the upstream-side catalyst 14a as much as possible. Therefore, in this embodiment according to the present invention, as shown in FIG. 21A, the engine exhaust passage between the hydrocarbon feed valve 15 and the upstream-side catalyst 14a is formed inside the straight extending exhaust pipe 12. In this case, to further prevent the fed hydrocarbons from diffusion, as shown in FIG. 21A, it is preferable to fit the upstream-side catalyst 14a inside the exhaust pipe 12 of a constant diameter.

Note that, in the present invention, the upstream-side catalyst 14a may be comprised of an oxidation catalyst, and just a partial oxidation action of hydrocarbons, that is, just a reforming action of the hydrocarbons may be performed in the upstream-side catalyst 14a. In this case, production of the reducing intermediate and the purification action of the $NO_x$ are performed in the downstream-side catalyst 14b. Therefore, in the present invention, the upstream-side catalyst 14a has a cross-sectional area smaller than the downstream-side catalyst 14b and has the function of at least reforming the hydrocarbons which are fed from the hydrocarbon feed valve 15.

Further, in the present invention, as the downstream-side catalyst 14b, for example, it is possible to use an $NO_x$ purification catalyst in which a metal having a lower oxidizing strength than a precious metal is carried on a catalyst carrier. In this $NO_x$ purification catalyst, for example, the catalyst carrier is comprised of alumina or zeolite, while the metal which is carried on this catalyst carrier is comprised of at least one transition metal selected from silver Ag, copper Cu, iron Fe, vanadium V, molybdenum Mo, cobalt Co, nickel Ni, and manganese Mn. Therefore, in the present invention, precious metal catalysts 51 and 52 are carried on the exhaust gas flow surface of at least one catalyst of the upstream-side catalyst 14a and downstream-side catalyst 14b, and a basic exhaust gas flow surface part 54 is formed around the precious metal catalysts 54 and 52.

Now, the oxidation reaction of hydrocarbons which flow into the upstream-side catalyst 14a is performed most actively at the upstream end of the upstream-side catalyst 14a. Therefore, at the upstream-side catalyst 14a, the temperature of the upstream end becomes the highest. If the temperature of the upstream end of the upstream-side catalyst 14a becomes high, the produced active $NO_x^*$ will start to be desorbed and as a result the amount of production of the reducing intermediate will start to fall, so the $NO_x$ purification rate will start to fall. That is, the temperature TCA of the upstream end of the upstream-side catalyst 14a has a predetermined limit temperature $TC_{max}$ beyond which a drop in the $NO_x$ purification rate is caused. This limit temperature $TC_{max}$ is about 500° C.

Therefore, in this embodiment according to the present invention, when the temperature TCA of the upstream end of the upstream-side catalyst 14a exceeds the predetermined limit temperature $TC_{max}$ beyond which a drop in the $NO_x$ purification rate is caused, the temperature TCA of the upstream end of the upstream-side catalyst 14a is lowered. One method for lowering the temperature TCA of the upstream end of the upstream-side catalyst 14a is the method of increasing the feed amount of hydrocarbons to make the atmosphere in the upstream-side catalyst 14a rich. If making the atmosphere in the upstream-side catalyst 14a rich, the oxidation reaction is suppressed and the heat of evaporation of the fed hydrocarbons causes the temperature TCA of the upstream end of the upstream-side catalyst 14a to fall.

Further, other methods of lowering the temperature TCA of the upstream end of the upstream-side catalyst 14a are to lengthen the vibration period ΔT of the concentration of hydrocarbons which flow into the upstream-side catalyst 14a, that is, to lengthen the injection period of the hydrocarbons, or to stop the feed of hydrocarbons. In the present invention, either of these methods is used.

Figure 22:
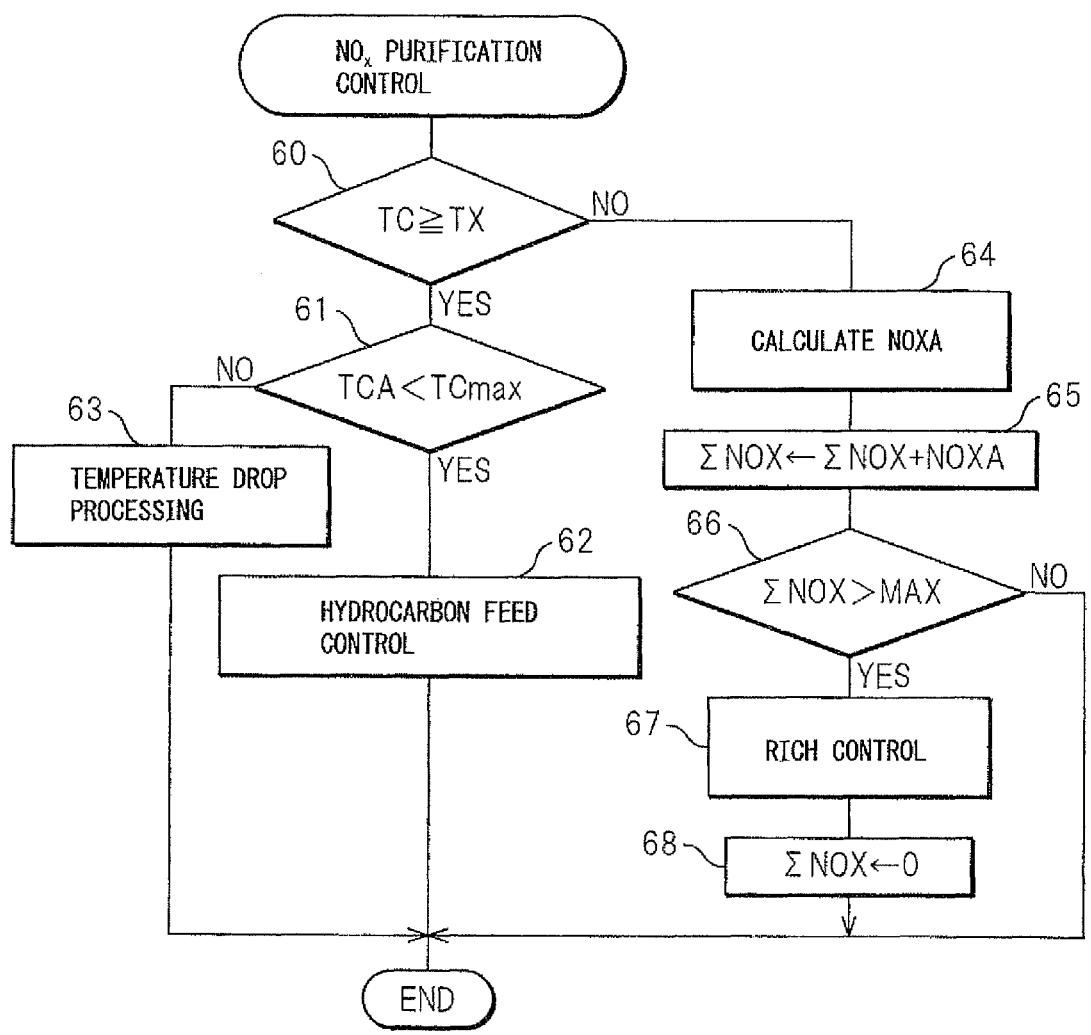
FIG. 22 is a flow chart for $NO_x$ purification control.

FIG. 22 shows the $NO_x$ purification control routine. This routine is executed by interruption every constant time.

Referring to FIG. 22, first, at step 60, it is judged from the output signal of the temperature sensor 23 if the temperature TO of the upstream-side catalyst 14a exceeds the activation temperature TX. When TC≥TX, that is, when the upstream-side catalyst 14a is activated, the routine proceeds to step 61 where it is judged from the output signal of the temperature sensor 23 if the temperature TCA of the upstream end of the upstream-side catalyst 14a exceeds the predetermined limit temperature $TC_{max}$ beyond which a drop in the $NO_x$ purification rate is caused. When $TCA<TC_{max}$, it is judged that the first $NO_x$ purification method should be used. At this time, the routine proceeds to step 62. At step 62, feed control of hydrocarbons from the hydrocarbon feed valve 15 is performed. At this time, the $NO_x$ purification action by the first $NO_x$ purification method is performed.

On the other hand, when it is judged at step 61 that $TCA≥TC_{max}$, the routine proceeds to step 63 where a temperature drop processing in which the temperature TCA of the upstream end of the upstream-side catalyst 14a is made to fall is performed. For example, the concentration of hydrocarbons which flow into the upstream-side catalyst 14a is raised so that when the air-fuel ratio of the exhaust gas which flows into the upstream-side catalyst 14a is lean, the air-fuel ratio of the exhaust gas is made to become rich, while when the air-fuel ratio of the exhaust gas which flows into the upstream-side catalyst 14a is rich, the air-fuel ratio of the exhaust gas is made to become further rich. Alternatively, the vibration period of the concentration of hydrocarbons which flow into the upstream-side catalyst 14a is made longer or the feed of hydrocarbons from the hydrocarbon feed valve 15 is stopped.

On the other hand, when it is judged at step 60 that TC<TX, it is judged that the second $NO_x$ purification method should be used, then the routine proceeds to step 64. At step 64, the $NO_x$ amount NOXA of the $NO_x$ exhausted per unit time is calculated from the map shown in FIG. 18. Next, at step 65, $\Sigma NO_x$ is increased by the exhausted $NO_x$ amount NOXA to calculate the stored $NO_x$ amount $\Sigma NO_x$. Next, at step 66, it is judged if the stored $NO_x$ amount $\Sigma NO_x$ exceeds the allowable value MAX. When $\Sigma NO_x>MAX$, the routine proceeds to step 67 where the additional fuel amount WR is calculated from the map shown in FIG. 20 and an injection action of the additional fuel is performed. Next, at step 68, $\Sigma NO_x$ is cleared.

REFERENCE SIGNS LIST

4 . . . intake manifold
5 . . . exhaust manifold
7 . . . exhaust turbocharger
12 . . . exhaust pipe
13 . . . exhaust purification catalyst
14a . . . upstream-side catalyst
14b . . . downstream-side catalyst
15 . . . hydrocarbon feed valve

The invention claimed is:

1. An exhaust purification system of an internal combustion engine, the exhaust purification system comprising:
   an engine exhaust passage;
   a hydrocarbon feed valve for feeding hydrocarbons arranged inside of the engine exhaust passage;
   an exhaust purification catalyst for reacting $NO_x$ contained in exhaust gas and reformed hydrocarbons arranged inside of the engine exhaust passage downstream of the hydrocarbon feed valve, wherein the exhaust purification catalyst is comprised of an upstream-side catalyst and a downstream-side catalyst arranged in series and at an interval from each other, and the upstream-side catalyst has a smaller cross-sectional area than the downstream-side catalyst and has a function of at least reforming hydrocarbons that are fed from the hydrocarbon feed valve;

a precious metal catalyst, wherein the precious metal catalyst is carried on an exhaust flow surface of at least one catalyst of the upstream-side catalyst, and the downstream-side catalyst and a basic exhaust gas flow surface part is formed around the precious metal catalyst; and an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein when the electronic control unit controls the vibration of the concentration of hydrocarbons flowing into the exhaust purification catalyst within the predetermined range of amplitude and within the predetermined range of period, the concentration of hydrocarbons flowing to the upstream-side catalyst vibrate within the predetermined range of amplitude and within the predetermined range of period, and the exhaust purification catalyst has a property of chemically reducing the $NO_x$ that is contained in exhaust gas without storing, or storing a fine amount of nitrates in the exhaust purification catalyst, and when the electronic control unit controls the vibration period of the hydrocarbon concentration longer than the predetermined range period, the exhaust purification catalyst has a property of being increased in storage amount of $NO_x$ that is contained in exhaust gas.

2. The exhaust purification system of an internal combustion engine as claimed in claim 1, wherein the engine exhaust passage between the hydrocarbon feed valve and the upstream-side catalyst is formed inside a straight extending exhaust pipe.

3. The exhaust purification system of an internal combustion engine as claimed in claim 1, wherein when a temperature of an upstream end of the upstream-side catalyst exceeds a predetermined limit temperature beyond which a drop in a $NO_x$ purification rate is observed, the electronic control unit is further configured to lower the temperature of the upstream end of the upstream-side catalyst by raising the concentration of hydrocarbons that flow to the upstream-side catalyst so that an air-fuel ratio of the exhaust gas is made rich when the air-fuel ratio of the exhaust gas flowing into the upstream-side catalyst is lean, and the air-fuel ratio of the exhaust gas is made richer when the air-fuel ratio of the exhaust gas flowing into the upstream-side catalyst is rich.

4. The exhaust purification system of an internal combustion engine as claimed in claim 1, wherein when a temperature of an upstream end of the upstream-side catalyst exceeds a predetermined limit temperature beyond which a drop in a $NO_x$ purification rate is observed, the electronic control unit is further configured to lower the temperature of the upstream end of the upstream-side catalyst by lengthening the vibration period of the concentration of hydrocarbons that flow to the upstream-side catalyst or by stopping a feed of hydrocarbons from the hydrocarbon feed valve.

5. The exhaust purification system of an internal combustion engine as claimed in claim 1, wherein $NO_x$ contained in exhaust gas and reformed hydrocarbons are reacted inside the exhaust purification catalyst to produce a reducing intermediate containing nitrogen and hydrocarbons and wherein the vibration period of the hydrocarbon concentration is a vibration period required for continued production of the reducing intermediate.

6. The exhaust purification system of an internal combustion engine as claimed in claim 5, wherein the vibration period of the hydrocarbon concentration is 0.3 second to 5 seconds.

7. The exhaust purification system of an internal combustion engine as claimed in claim 1, wherein the precious metal catalyst is comprised of platinum (Pt) and at least one of rhodium (Rh) or palladium (Pd).

8. The exhaust purification system of an internal combustion engine as claimed in claim 1, wherein a basic layer containing an alkali metal, an alkali earth metal, a rare earth, or a metal that can donate electrons to $NO_x$ is formed on the exhaust gas flow surface of the exhaust purification catalyst, and wherein a surface of the basic layer forms the basic exhaust gas flow surface part.

* * * * *